June 30, 1925.
L. J. WALSTAD
SAW TABLE
Filed Aug. 20, 1924
1,544,290
2 Sheets-Sheet 2
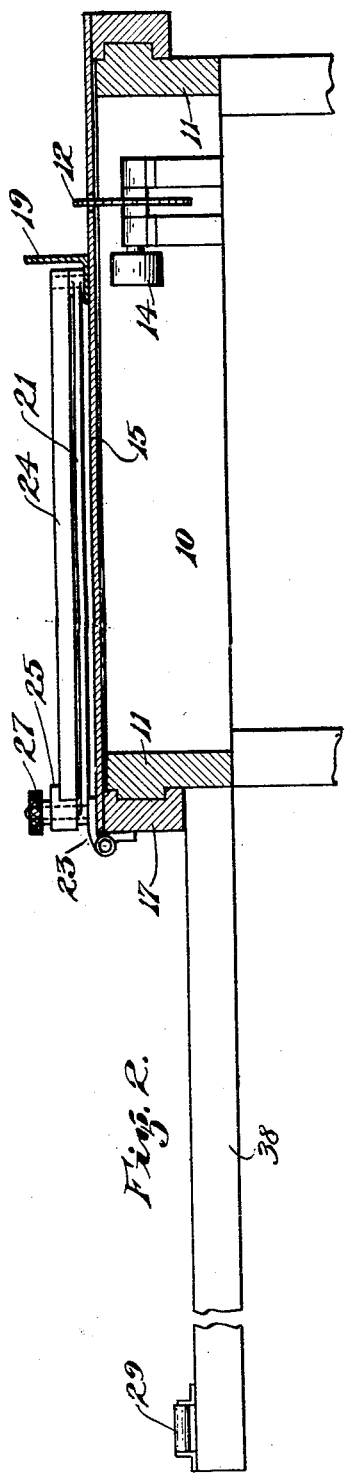
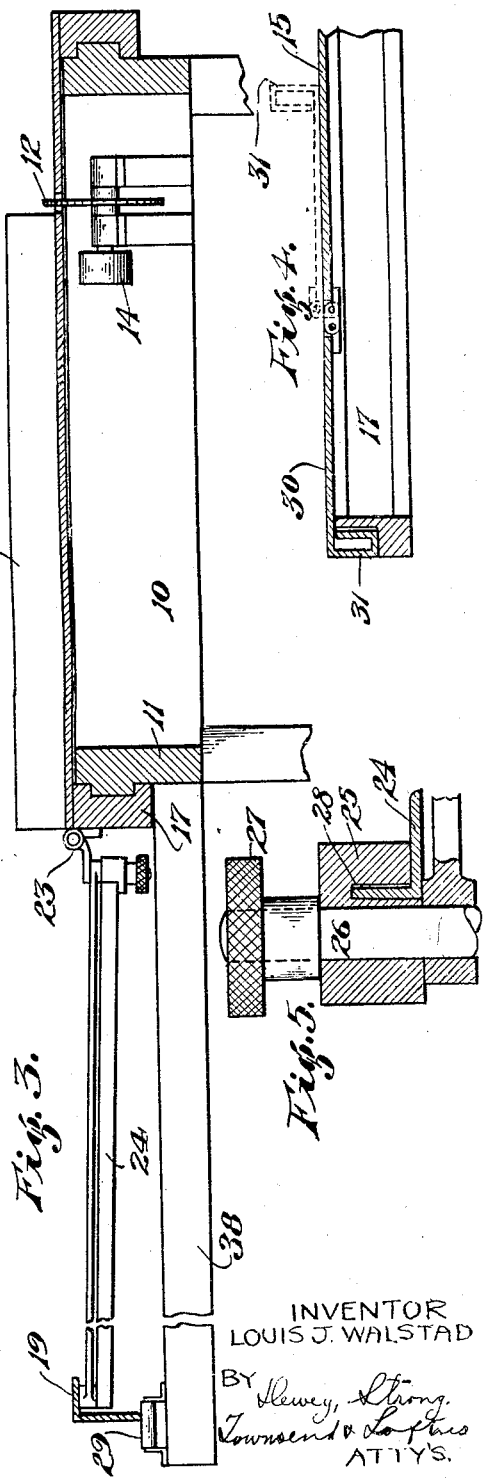
INVENTOR
LOUIS J. WALSTAD
BY
ATT'YS.

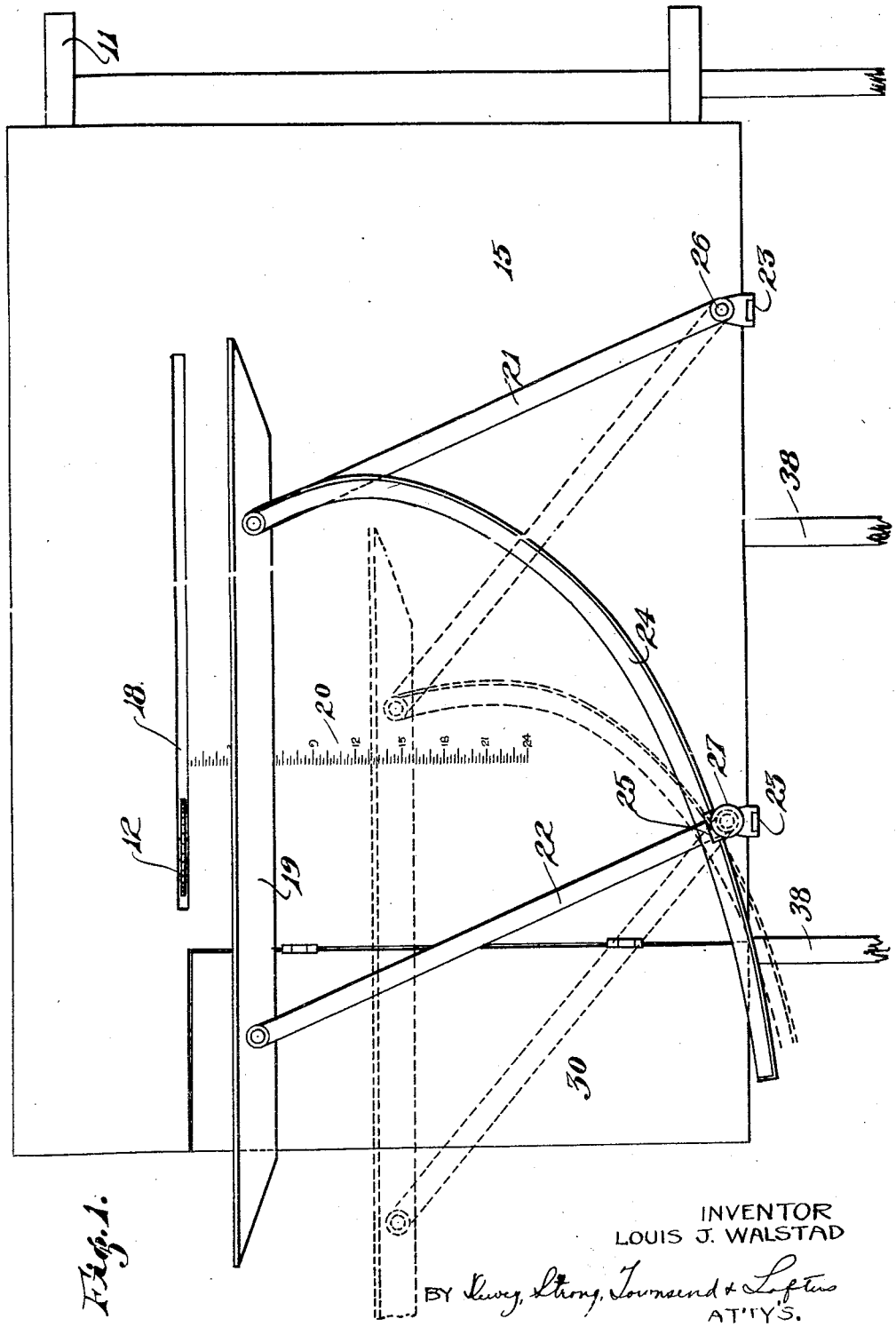

Patented June 30, 1925.

1,544,290

UNITED STATES PATENT OFFICE.

LOUIS J. WALSTAD, OF OAKLAND, CALIFORNIA.

SAW TABLE.

Application filed August 20, 1924. Serial No. 733,124.

*To all whom it may concern:*

Be it known that I, LOUIS J. WALSTAD, a citizen of the United States, residing at Oakland, county of Alameda, and State of California, have invented new and useful Improvements in Saw Tables, of which the following is a specification.

This invention relates to wood working machinery and particularly pertains to a saw table.

It is the principal object of the present invention to provide a generally improved saw table of the character referred to, which is fitted with means capable of assisting in maintaining the material correctly positioned relative to the saw and gaging the width of cut, which means is simple in construction and expedites ripping and sawing off boards and the like.

In carrying out this object I provide a saw table movable with relation to a stationary saw. The saw table is fitted with transverse and longitudinal guides which may be independently placed in use for ripping boards and the like or sawing them off. The longitudinal guide mentioned is adjustable so that it may be set to provide any predetermined width of cut.

One form which the invention may assume is exemplified in the following description and illustrated by way of example in the accompanying drawings, in which:

Fig. 1 is a plan view of the saw table, showing the longitudinal guide thereon in full, and in a second position in dotted lines.

Fig. 2 is a transverse section through the saw table, disclosing the longitudinal guide in position thereon.

Fig. 3 is a transverse section through the saw table showing the longitudinal guide in an extended position to serve as an extension for the table, and with the transverse guide in operating position on the table.

Fig. 4 is a fragmentary longitudinal section of the table, disclosing the mounting of the transverse guide and the operating position thereof in dotted lines.

Fig. 5 is an enlarged fragmentary view of the latching mechanism by which the longitudinal guide is latched into a set position.

Referring more particularly to the accompanying drawings 10 indicates a stationary frame which is of a rigid construction. The opposite sides of this frame are formed with parallel guide rails 11 which are disposed horizontally and longitudinally of the frame. Mounted on the frame is a circular saw 12, the shaft of which is fitted with a pulley 14 by which the saw may be driven. It is preferred that this pulley be connected by a belt to an electric motor or like driving element supported by the frame. As this driving connection forms no part of the present invention it is not illustrated.

Mounted on the frame is a plane sliding top 15 which is fitted with longitudinal guide rails 17. These guide rails are disposed beneath the top at its opposite sides and slidably engage the guide rails 11 of the frame. This mounting permits the sliding top to be reciprocated on the frame longitudinally with respect to the saw. In the present instance the top is shown as adapted to be reciprocated manually, but it is to be understood, however, that mechanical means may be employed to operate the top if desired.

From Figure 1 it is seen that the sliding top is formed with a longitudinal slot 18 through which the saw blade projects. This longitudinal slot is disposed in parallelism with the saw and with the direction of travel of the sliding top. It is intended that boards or the like be stationarily held on the top and that the latter be moved relative to the frame to engage the board with the saw blade to trim or rip the board.

Reference being had to Fig. 1, I show what I prefer to term a longitudinal guide 19 disposed on the sliding top 15. This longitudinal guide is disposed parallel to the path of travel of the sliding top and to the plane of the saw blade and is for the purpose of aligning boards to be trimmed or ripped with the saw blade. The longitudinal guide member 19 is adjustable toward and away from the saw blade in parallelism therewith, so that it will serve as a gage for the boards being trimmed or ripped. For this purpose I provide a calibrated scale 20 which is imprinted or otherwise formed on the surface of the sliding top and in a position for cooperation with the working surface of the longitudinal guide 19.

For the purpose of providing adjustment of the longitudinal guide 19 I provide a pair of parallel links 21 and 22 which are pivotally connected at one end to the longitudinal guide. The other ends of these links 20 are pivotally connected to hinges 23 which are rigidly secured to the table top. These pivotal end hinge connections are provided so that the longitudinal guide 19 may be removed from the table top and disposed in an extended position as shown in Fig. 3 to form an extension of the table top. The purpose of this extension will hereinafter be more fully described.

To lock the longitudinal guide 19 in a set position on a table top a curved latching lever 24 is provided. This lever is angle shaped and one of its flanges is disposed vertically. One end of the lever 24 is pivoted to the longitudinal guide 19. The other end engages a latching member 25 which is mounted on the pivot pin 26 which connects the end of the link 22 to the hinge 23. This latching member 25 is formed with a slot 28 through which the vertical flange of the latching lever 24 extends. The upper end of the pivot pin 26 is threaded to receive a thumb nut 27 which is the medium by which the latching member 25 may be caused to clamp the latching lever 24 into a stationary position. By holding the lever 24 stationary the longitudinal guide 19 will be held into a set position with relation to the saw blade 12. It is obvious that any movement of the longitudinal guide 19 will be in a plane parallel to the path of travel of the table, due to the provision of the parallel links 21 and 22.

The longitudinal guide is for use in trimming or ripping boards, and from the foregoing description it is obvious that it serves not only as a guide, but as a gage as well. For instance, if it is desired to rip a board into strips of a determined width the longitudinal guide is adjusted until its working surface aligns with the determined calibration on the scale. The guide is then latched into position and the board is placed on the table with its edge against the working surface of the guide 19. The table may then be moved relative to the saw to engage the latter with the board. This operation is repeated until the board has been ripped into strips of the determined width.

When using the table to saw off boards or the like, the longitudinal guide 19 is swung off the table top to its extended position as shown in Fig. 3. It is supported in this position by beams 38 which extend horizontally from the frame. The outer ends of these beams 38 are fitted with rollers 29 upon which the longitudinal guide 19 bears. When in extended position the uppermost surface of the horizontal guide 19 is substantially in alignment with the surface of the sliding top, so that boards laid transversely of the table will be supported at their outermost ends upon the guide 19. To form a transverse guide for the table for use in sawing off boards, I provide a transverse guide 30. This guide is clearly shown in Figs. 1 and 4, and comprises a flat portion having a right angularly extending flange 31 which constitutes the guiding surface. The flat portion of the guide 30 is inserted into the surface of the sliding top 15 and is disposed flush therewith, the contiguous edges of the flat portion of the guide and top being hinged together so that the transverse guide 30 may be folded over onto the top, as shown in dotted lines in Fig. 4. In this position the flange of the guide will project vertically. It is obvious that the flange 31 will be disposed at right angles to the path of travel of the sliding top 15 and to the plane of the saw blade.

In operation of the device, when used for ripping boards, the longitudinal guide 19 is disposed on the table top and adjusted with relation to the scale to the determined distance from the saw. The board to be trimmed or ripped is then disposed on the table top with its edge against the working surface of the guide 19. The sliding top may then be operated to engage the board with the saw.

In sawing off the boards, the longitudinal guide 19 is extended to the position shown in Fig. 3 and the transverse guide is folded onto the sliding top. A board is then laid on the sliding top with its edge against the transverse guide. The sliding top may then be operated to engage the board with the saw.

While I have shown the preferred form of my invention, it is to be understood that various changes might be made in the combination, construction and arrangement of parts by those skilled in the art, without departing from the spirit of the invention as claimed.

Having thus described my invention, what I claim and desire to secure by Letters Patent is:

1. A device of the character described, including a saw, a support for material to be cut, said support being reciprocable in a plane parallel to the saw, whereby to bring material thereon into engagement with the saw, a longitudinal guide mounted on the support, connections between said guide and said support, whereby the guide may be removed from the table and swung into a position where it will act as an extension for the support, and a member carried by the support and adapted to be arranged thereon as a transverse guide when said longitudinal guide member is in extended position or to be shifted out of operative position.

2. In a device of the character described, including a saw, a support for material to be cut, said support being adapted to be reciprocated in a plane parallel to the saw, to bring material to be cut thereon into engagement with the saw, a longitudinal guide mounted on said support and normally disposed in parallelism with the path of travel of the support, connections between said longitudinal guide and the support, whereby said guide may be adjusted toward and away from the saw in a parallel plane, said connections permitting said longitudinal guide to be removed from the support to a position where it will act as an extension of the support, a transverse guide carried by the support and normally disposed in a position unobstructing the surface thereof, said transverse guide being hinged to the support and capable of being folded onto the support when said longitudinal guide is disposed in an extended position.

3. A device of the character described comprising a frame, a revoluble saw carried by the frame, a sliding top carried by the frame for supporting material to be operated on by the saw, said top being adapted to be reciprocated in a direction parallel to the plane of the saw, a longitudinal guide mounted on the top, connections between said guide and said top permitting said guide to be adjusted toward and away from said saw in parallelism therewith, said connections comprising a pair of parallel links pivoted at one end to the guide and at the other end to the top, and a transverse guide carried by the top and capable of being disposed in operating position on the top, or in a position unobstructing the surface of the top.

4. A device of the character described comprising a frame, a revoluble saw carried by the frame, a top slidably mounted on the frame for supporting material to be operated on by the saw, said top being adapted to be reciprocated in a plane parallel to the saw, a longitudinal guide mounted on the top, connections between said guide and said top permitting adjustment of the guide toward and away from the saw and in parallelism therewith, said connection comprising a pair of parallel links pivotally connected at one end to said guide, hinges fixed to the top and to which the other end of said links are pivotally connected, said hinges permitting said guide to be removed from the top to a position where it will form an extension of said top, and a transverse guide carried by the top and capable of being disposed either in operating position on the top or in a position unobstructing the surface of the top.

5. A device of the character described comprising a frame, a sliding top mounted on the frame for supporting material to be operated on by the saw, a longitudinal guide mounted on the top and disposed parallel to the saw, a calibrated scale on the top, with which said guide cooperates, connections between said longitudinal guide and the top whereby said guide may be adjusted toward and away from the saw in a plane parallel thereto, said connections comprising a pair of parallel links pivoted at one end to the guide and at the other end to the top, means for locking said guide in a set position, said means comprising a curved lever pivoted at one end to the guide, a clamping member mounted on the top and slidably receiving said lever, said clamping means being operative to hold said lever stationary whereby to lock said longitudinal guide in said position, pivotal connections between said parallel links and said top, being hinged to the top whereby said longitudinal guide may be disposed in a position extended from said top to form an extension thereof, and a transverse guide member hinged to the top and capable of being folded over onto the top in operating position when said longitudinal guide is moved to its extended position.

6. A device of the character described comprising a frame, a revoluble saw carried by the frame, a top slidably mounted on the frame for supporting material to be operated on by the saw, said top being adapted to be reciprocated in a plane parallel to the saw, a longitudinal guide mounted on the top, connections between said guide and said top permitting adjustment of the guide toward and away from the saw and in parallelism therewith, said connection comprising a pair of parallel links pivotally connected at one end to said guide, hinges fixed to the top and to which the other end of said links are pivotally connected, said hinges permitting said guide to be removed from the top to a position where it will form an extension of said top.

LOUIS J. WALSTAD.